United States Patent [19]

Radici et al.

[11] 4,268,643
[45] May 19, 1981

[54] PROCESS FOR IMPROVING THE STABILITY OF ACETAL POLYMERS

[75] Inventors: Pierino Radici, Turate; Sergio Custro, Gorla Maggiore; Paolo Colombo, Saronno, all of Italy

[73] Assignee: Societa Italiana Resine S.I.R. S.p.A., Milan, Italy

[21] Appl. No.: 88,250

[22] Filed: Oct. 25, 1979

[51] Int. Cl.³ .............................................. C08G 6/00
[52] U.S. Cl. .................................... 525/400; 525/398; 528/230
[58] Field of Search ................. 525/398, 400; 528/230

[56] References Cited
U.S. PATENT DOCUMENTS

| | | | |
|---|---|---|---|
| 3,125,551 | 3/1964 | Punderson | 525/400 |
| 3,192,182 | 6/1965 | Brown et al. | 525/398 |
| 3,347,830 | 10/1967 | Nakajima | 525/400 |
| 3,998,791 | 12/1976 | Radici et al. | 525/398 |

*Primary Examiner*—Lucille M. Phynes
*Attorney, Agent, or Firm*—Sughrue, Rothwell, Mion, Zinn and Macpeak

[57] ABSTRACT

The terminal hydroxyl groups of an acetal polymer are esterified or etherified by reaction with an end-capping agent chosen from anhydrides of carboxylic acids, orthoesters and orthocarbonates, by forming an intimate mixture of polymer in powder form and liquid end-capping agent, the amount of said agent in the mixture being less than that which results in loss of the free-flowing characteristics of the powder, and reacting said mixture under stirring at 50°–170° C.

15 Claims, No Drawings

PROCESS FOR IMPROVING THE STABILITY OF ACETAL POLYMERS

BACKGROUND OF THE INVENTION

The present invention relates to a process for improving the stability of acetal polymers of converting the unstable terminal hydroxyl groups of said polymers into groups of higher stability, and more particularly into ester or ether groups by treatment with orthoesters, orthocarbonates or anhydrides of organic acids. The acetal polymers which may be treated by the process of the present invention are those having molecular weights greater than about 10,000, which are prepared in the art by the polymerisation of an aldehyde or the copolymerization of one or more aldehydes with non-aldehyde monomers. Those acetal polymers which are obtained from cyclic oligomers of aldehydes, such as, for example, trioxan and tetraoxan (oligomers of formaldehyde) by homo-polymerization or by copolymerization with non-aldehyde monomers may also be treated by the process of the present invention.

It is known that acetal polymers resulting from polymerization and copolymerization processes contain at least one terminal hydroxyl group per macromolecule.

The unstability of these hydroxyl groups brings about a gradual degradation of the macromolecular chains at the temperatures required for the processing of the polymers. It is therefore necessary to treat the latter in order to transform the hydroxyl groups into other groups of higher characteristics of thermal and chemical stability. In particular these characteristics of stability may be conferred by transforming the hydroxyl groups into ester groups by reaction with anhydrides of carboxylix acids, especially acetic, propionic and butyric acids, or into ether groups by reaction with orthoesters, dialkylacetals, ketals and organic orthocarbonates.

The known processes may be carried out by different methods and in practice there are four basic techniques which may be summarized thus:

the end-capping agent (esterifying or etherifying agent) is brought into contact with the acetal polymer dispersed in a liquid medium which is not a solvent for the polymer; this liquid medium may consist in part, or wholly, of the end-capping agent.

the end-capping agent is brought into contact with the acetal polymer dissolved in a liquid which is a solvent for the polymer; this solvent liquid may consist wholly or in part of the end-capping agent.

the end-capping agent is brought into contact with the acetal polymer dispersed in a mixture of two liquids consisting of a solvent and a non-solvent for the polymer, these liquids being completely miscible at the treatment temperature.

the end-capping agent in the vapour state is brought into contact with the acetal polymer in the form of fluidized solid particles.

Techniques of this type are, for example, described in U.S. Pat. Nos. 2,998,409, 2,964,500, 3,192,182 and 3,875,117 and in British Pat. No. 880,737.

The processes described are generally satisfactory in the sense that an end-capped (esterified or etherified) product is obtained, although differences, which may even be considerable, occur in terms of the economy of the processes and the yield and properties of the end-capped polymers. One common characteristic of the processes under discussion is that they need relatively high quantities of the end-capping agent and/or the solvent or dispersing liquid compared with the quantity of polymer subjected to the end-capping treatment. In particular, in processes in which the reaction is carried out in the liquid phase, the weight ratio between the liquid and the acetal polymer is at least 3:1 and may be up to 15:1.

In the cases cited, specific technological and also chemical problems occur depending on the particular system chosen for the reaction. Thus, for example, when the end-capping reaction is carried out by the solution method, the precipitation of the end-capped acetal polymer is a point of considerable difficulty. On the other hand, when the reaction is carried out by the fluid-bed method, high quantities of gas and/or vapour are required and there are further difficulties in achieving intimate contact between the solid particles of the polymer and the end-capping agent. Moreover, in all the cases cited, the presence of large quantities of liquids and of end-capping agents makes the process difficult to carry out economically due to the need to recover both the unreacted end-capping agent and the liquid used for dissolving or dispersing the polymer as completely as possible.

A need is also felt for carrying out the reaction with small quantities of end-capping agent in view of the ease with which this agent interacts with the aldehyde monomer which is formed due to degradation of the acetal polymer. Thus, for example, in the case of the esterification of polyformaldehyde, the formaldehyde monomer which is formed reacts with acetic anhydride and thus forms by-products of the methylene-glycolacetate type which are difficult to separate and harmful to the acetal polymer, above all in terms of the colour of the polymer.

SUMMARY OF THE INVENTION

An object of the present invention is, therefore, a process for end-capping acetal polymers which is free from the disadvantages given above.

More particularly, the present invention provides a process for esterifying or etherifying the terminal hydroxyl groups of an acetal polymer by reacting the said polymer with an end-capping agent chosen from anhydrides of carboxylic acids, orthoesters and orthocarbonates, characterised by forming an intimate mixture of acetal polymer in powder form and end-capping agent in liquid form, the amount of end-capping agent being less than that which results in loss of the free-flowing characteristics of the polymer powder, reacting said mixture under stirring at a temperature of at least 50° C. until completion or substantial completion of the end-capping reaction, and recovering the polymer thus end-capped from the reaction product.

DETAILED DESCRIPTION OF THE INVENTION

A basic aspect of the process of the present invention is, therefore, the end-capping of the acetal polymer, in powder form, with such a quantity of liquid end-capping agent as not to vary the characteristics typical of this physical state of the material, particularly the free-running characteristics. In practice it is found that this result can be achieved by using an amount of end-capping agent of from 0.01 to 0.30 parts by weight for every part by weight of acetal polymer, and preferably from 0.02 to 0.15 parts by weight for every part by weight of the said acetal polymer, the lower limit in every case being dictated by the need to carry the end-capping reaction to completion, or substantial completion.

It is found that, under these conditions, the acetal polymer, particularly in powder form with a grain size of from 20 to 500 microns, loses substantially none of its free-flowing characteristics and may thus be treated in powder reactors provided with agitators, which can achieve a high rate of heating of the mass up to the pre-chosen temperature for the reaction, and which achieve intimate contact between the polymer and the end-capping agent.

The preparation of the intimate mixture between the powdery acetal polymer and the end-capping agent may be carried out by different methods. Thus the polymer may be moistened or wetted with the liquid end-capping agent before being fed into the reactor, or directly within the reactor. Moreover the end-capping agent may be used as it is or dissolved in a low-boiling diluent which is inert (non reactive) under the reaction conditions.

According to a preferred embodiment, the polymer is first wetted with a solution of the end-capping agent in an organic solvent in such proportions as to achieve an amount of the acid agent within the limits indicated above. The solvent is then evaporated at a temperature lower than the end-capping temperature and the free-flowing powder thus obtained is treated in the manner indicated.

In particular, the reaction temperature is conveniently maintained within a range of values of from 70° to 170° C. In the case of an etherification reaction, a broader range of from 50° to 170° C. may also be used, the preferred values being generally from 80° to 165° C. In the case of an esterification reaction, the preferred values are generally from 100° to 165° C. The end-capping pressure should be such as to maintain the end-capping agent substantially in liquid form at the selected reaction temperature. The pressure is generally maintained at a value equal to or greater than atmospheric, the most convenient values depending mainly on the volatility of the agent chosen for the end-capping reaction. Generally it is preferable to use a superatmospheric pressure, even in the case of highboiling end-capping agents so as to substantially avoid any loss of the said agent by evaporation.

The duration of the end-capping reaction is conveniently from 1 to 120 minutes, and preferably from 5 to 90 minutes, the most suitable values being selected in each individual case in dependence on the reaction temperature, the type and actual choice of the end-capping agent, the presence of or lack of end-capping catalyst, as well as the characteristics of the acetal polymer, so as to ensure the completion or substantial completion of the reaction.

In the case of an esterifying reaction the end-capping agent is chosen from the anhydrides of carboxylic acids, particularly the anhydrides of acetic, propionic and butyric acids.

Furthermore, the reaction may be carried out in the presence of substances which have a catalytic effect on the esterification reaction and/or inhibit degradation phenomena which result in a reduction in the molecular weight of the acetal polymer. Compounds belonging to the following classes are useful for these purposes:

organic compounds of elements belonging to group V b of the periodic system of the elements, particularly, triorgano-phosphines, -stibines and -arsines, as well as quaternary ammonium and phosphonium salts; examples of these compounds are triphenylphosphine and dimethyldioctadecylammonium acetate;

amides of substituted or unsubstituted mono-and poly-basic acids, polyamides, poly-N-vinyl lactams, urea, thiourea, polyureas and polyisocyanates; examples of these compounds are N,N'-dimethyl-caprylamide, N,N'-dimyristylhexamethylenediamide, polycaprolactam, polyvinyl pyrrolidone, dibutylethylurea and high-molecular-weight products obtained by polymerization of n-butylisocyanate;

salts in which the cation is an alkali metal and the anion results from an acid having a dissociation constant of less than $1.5 \times 10^{-4}$, in water at 25° C.; examples of these compounds are acetates of lithium, sodium and potassium and stearates of lithium and sodium.

The compounds belonging to the first and third groups mentioned above are conveniently used in quantities of from 0.001 to 5% by weight and those belonging to the second group in quantities of from 0.05 to 10% by weight with respect to the weight of the esterifying agent.

In the case of an etherifying reaction the end-capping agent is chosen from orthoesters, usually orthoesters of aliphatic or aromatic acids with aliphatic, cycloaliphatic or aromatic alcohols such as methyl or ethyl orthoformate, methyl or ethyl orthoacetate and methyl or ethyl orthobenzoate, and orthocarbonates, such as methyl or ethyl orthocarbonate.

The etherification reaction may conveniently be carried out in the presence of Lewis-acid type catalysts, and in particular:

strong, or medium-strength mineral acids, the acid dissociation constant, or first acid dissociation constant, of which is greater than $10^{-4}$. Examples of these acids are sulphuric, phosphoric and perchloric acids.

strong or medium-strength organic acids, the acid dissociation constant, or first acid dissociation constant of which is greater than $10^{-5}$. Examples of these acids are p-toluene sulphonic, acetic and oxalic acids.

alkyl, cycloalkyl and alkylaromatic esters of strong or medium-strength mineral acids. Examples of these esters are dimethyl and diethyl sulphate as well as dimethyl and diethyl hydrogen phosphate.

alkyl, cycloalkyl and alkylaromatic esters of strong or medium-strength organic acids. An example of these esters is methyl-p-toluenesulphonate.

The quantity of catalyst used in the etherification reaction may vary within wide limits and, in general, from 0.001 to 0.02 parts by weight for every part by weight of the etherification agent. The catalyst may be added at any time before the start of the etherification reaction. According to a preferred embodiment, it is added together with the etherifying agent to the solution of this agent in its solvent (or diluent).

When using the end-capping agent in the form of a solution in a solvent, the latter is conveniently used in amounts of from 0.05 to 0.50 parts by weight for every part by weight of the acetal polymer, so as to easily achieve intimate mixing of the polymer with the end-capping agent.

The solution of the end-capping agent may be added to the powdery polymer before or after the latter is loaded into the reactor. In each case it is preferable to remove the solvent (or diluent) completely, or substantially completely, before the start of the end-capping reaction in order to confer the aforesaid free-flowing characteristics on the acetal polymer. This removal may conveniently be carried out by evaporation at low temperature, in every case at a temperature lower than the end-capping temperature. During this evaporation every care should be taken to avoid the removal of the end-capping agent. Conveniently, the evaporation is carried out at subatmospheric pressure and the solvent (or diluent) thus recovered may be recycled without further purification.

The preferred solvents and diluents for the end-capping agent generally consist of low-boiling aliphatic, cycloaliphatic and aromatic hydrocarbons, such as linear or branched pentane, hexane or heptane, cycloexane and benzene. Halogenated lower aliphatic hydrocarbons such as methylene chloride, chloroform and carbon tetrachloride are also useful for this purpose. Finally, aliphatic ethers, such as diethyl ether, aliphatic esters such as methyl and ethyl formate and methyl and ethyl acetate, and aliphatic ketones such as acetone, may also be used with advantage, especially in the case of esterifying agents.

As noted in the foregoing, a basic characteristic of the process of the present invention is the carrying out of the reaction with a reactive system consisting of a free flowing powder containing the end-capping agent in liquid form. The other physical properties of the polymer powder, while not being particularly critical, represent an important aspect of the process, particularly with regard to the choice of the ratio between the acetal polymer and the end-capping agent and the choice of the manner of addition of said agent to the polymer.

In every case, the most important characteristics are the apparent density of the powder and its grain size distribution. Thus, as the apparent density (generally within the range of from 0.05 to 0.8 g/ml) and the grain size are increased, the ratio between the end-capping agent and the acetal polymer should be gradually reduced, while remaining within the range indicated. However, the process of the present invention may also be used without any particular problems in the case of acetal-polymer powders with characteristics different from those indicated above.

No matter what the chosen procedure, the end-capped acetal polymer obtained has the same physical characteristics as the polymer submitted to the end-capping reaction.

The process of the present invention allows intimate contact between the acetal polymer and its end-capping agent to be achieved, with consequent high reaction yields and production of an end-capped polymer with the desired properties of stability and colour. Moreover, the use of considerably reduced quantities of end-capping agents results in positive economical advantages with regard to the further stages of the process. In fact, the unreacted end-capping agent may be recovered immediately from the acetal polymer by applying a vacuum after the end of the reaction or by washing with a solvent.

Moreover, according to one embodiment, made possible by the small quantity of end-capping agent present at the end of the reaction, it may be economical to directly wash the end-capped polymer with water, although other washing agents may be used with advantage. In such a case the neutralisation and removal of the by-products, catalytic residues or other additives from the final product are facilitated. In particular, according to this embodiment, the reaction mixture may be discharged into water to form an aqueous suspension of the polymer, the latter being then recovered and dried. In the case of an esterification reaction, it may be sufficient to treat the reaction product with water at a low temperature (for example not exceeding 50° C.). In the case of an etherification reaction, it is generally preferred to use a basic aqueous (or organic) liquor in which the acid residues present are easily neutralised and removed from the etherified polymer. The basic substances may be present in amounts of from 0.01 to 10% by weight in the liquor and may be chosen from the hydroxides of alkali metals, the salts of alkali metals with weak organic or inorganic acids, ammonia and aliphatic and cycloaliphatic amines. In every case, the polymer finally recovered has the desired properties of colour and stability to heat.

EXAMPLE 1

The end-capping reaction is carried out in a 130 liter-capacity, steel receptacle provided with a dual system of agitation with elements suitable for mixing powders. The reactor is provided with an upper loading valve and a lower discharge valve, and is connected at its upper end to a vacuum pump by means of a tube in which an exchanger and a distillate collector are interposed. A device for controlling the pressure allows the reaction to be carried out in an inert atmosphere and at the desired pressure. A spray located in the top of the reactor allows the introduction of liquids in finely dispersed form. Finally the reactor is provided with a jacket for heating and cooling.

After flushing with nitrogen, there are introduved into the reactor 50 Kg of a crude polyoxymethylene (polyoxymethylene glycol) obtained by polymerisation of pure, monomeric formaldehyde in an inert liquid (heptane), using an anionic-type initiator. The polymer has an inherent viscosity $\eta_e$ of 1.59 dl/g. In the Examples, the inherent viscosity is determined at 60° C. in a 0.5% (weight/volume) solution of the polymer in para-chlorophenol containing 2 wt. % of $\alpha$-pinene. Furthermore, the polymer is in the form of a powder with the following characteristics:

| apparent density | 0.67 g/ml | |
|---|---|---|
| grain size distribution | >177 microns | 58.3% |
| | 177–60 microns | 36.7% |
| | <60 microns | 5.0% |

After the agitator has been started a solution consisting of 2.0 Kg of trimethyl orthoformate and 2.0 g of boron trifluoride etherate, is sprayed into the reactor. After 10 minutes of agitation, the mass is brought to 105° C. at a pressure of 1 atmosphere gauge, is left under these conditions for the next 30 minutes and is then cooled at 50° C. for 15 minutes at an absolute pressure of 0.02 atmospheres.

The etherified polymer containing less than 0.1% by weight of residual orthoester is discharged into an aqueous solution (200 liters) containing 1% by weight of ammonia. After 20 minutes of agitation at a temperature of 70° to 80° C., the suspension is centrifuged and the polymer is thoroughly washed with water and dried under vacuum at 80° C.

Thus 49.6 Kg of etherified polyoxymethylene are recovered on which the following determinations are carried out:
inherent viscosity: $\eta_e$
apparent density: $\gamma\alpha$ grain size
thermal degradatation at 220° C. in an atmosphere of nitrogen: $K_{220}$ This latter determination, which is carried out by means of a thermo-balance, indicates the rate of decomposition, in percentage by weight of polymer per minute, during the first 30 minute.

alkali-stable fraction: ASF

One part by weight of the polymer is heated in ten parts by weight of a solution of tributylamine (0.5% by weight) in dimethylformamide at 160° C. for 30 minutes. The fraction (percentage by weight) of polymer recovered after the treatment represents the alkali-stable fraction.

The following determinations are carried out on this final fraction:
inherent viscosity: $\eta_e$ (ASF)
thermal degradation: $K_{220}$ (ASF) The results of the determination are given in Table 1 under P-1.

EXAMPLE 2

A crude polyoxymethylene obtained in a similar manner to that of Example 1 and having the following characteristics, is etherified:

| $\eta_e$ = 2.15 dl/g | | |
|---|---|---|
| $\gamma_a$ = 0.27 g/ml | | |
| grain size | >177 microns | 14.3% |
| | 177–60 microns | 37.1% |
| | <60 microns | 48.6% |

The reaction being carried out under strictly anhydrous conditions, 20 Kg of the polymer are dispersed in a liquid consisting of 95 parts by weight of petroleum ether (boiling range 40° to 60° C.), 7.5 parts by weight of triethyl orthoformate and 0.15 parts by weight of diethyl sulphate. After filtration by centrifuge, the polymer is loaded into the reactor under agitation. The moist powder contains 0.30 parts by weight of liquid for every part by weight of polymer.

The temperature of the system is brought to 40° C. for 20 minutes at an absolute pressure of 0.4 atmospheres.

The solvent content in the polymer is thus reduced to a value of less than 0.2% by weight. At this point the system is brought to 0.7 atmospheres gauge and then heated at 145° C. for 30 minutes. At the end of this period, the reaction mixture is discharged quickly into an aqueous solution (200 liters) containing 1% by weight of sodium carbonate. The suspension is kept under agitation at 80° C. for 20 minutes and then centrifuged. The polymer, after thorough washing with water until the latter is neutral, is dried at 80° C. under vacuum.

19.92 Kg of etherified polyoxymethylene are thus recovered on which the determination indicated in Example 1 are carried out. The results of these determinations are given in Table 1 under P-2.

EXAMPLE 3

50 Kg of crude polyoxymethylene with an inherent viscosity of 1.47 dl/g are introduced into the reactor of Example 1 under strictly anhydrous conditions.

After the agitator has been started, a liquid consisting of 7.5 Kg of triethyl orthoformate and 102.5 g diethyl sulphate, is sprayed from the top of the reactor.

After 15 minutes of agitation at ambient temperature, the temperature is brought to 150° C. at a pressure of 1 atmosphere gauge and the mass is left under these conditions for 30 minutes. Subsequently the system is cooled to 100° C. for 15 minutes, the pressure simultaneously being lowered to about 0.02 atmospheres absolute. The reagent is collected in the condenser placed downstream of the exchanger.

The polymer is then discharged into an aqueous solution (200 liters) containing 1.5% by weight of ammonia. After about 30 minutes of agitation at a temperature of 80° to 90° C., the suspension is centrifuged and the polymer, washed with water until the latter is neutral, is dried under vacuum at 80° C.

49.6 Kg of etherified polyoxymethylene are thus recovered, the characteristics of which are given in Table 1 under P-3.

EXAMPLE 4

A crude polyoxymethylene obtained in a similar manner to that described in Example 1 and having the following characteristics, is etherified:

$\eta_e$ = 1.84 dl/g
$\gamma_a$ = 0.19 g/ml

The reaction being carried out under strictly anhydrous conditions, 15 Kg of the polymer are admixed with a liquid consisting of 80 parts by weight of anhydrous cyclohexane, 20 parts by weight of iso-amyl orthoformate and 0.40 parts by weight of boron trifluoride etherified with diethyl ether. After filtration in a centrifuge, the polymer is loaded into the reactor under agitation. The powder contains 0.31 parts by weight of liquid for every part by weight of polymer.

The temperature of the system is brought to 40° C. for 20 minutes under an absolute pressure of 0.6 atmospheres. The cyclohexane content of the polymer is thus reduced to a value less than 0.1% by weight.

The system is then brought to a pressure of 1 atmosphere gauge and heated at 155° C. for 60 minutes.

At the end of this period of time, the mixture is cooled to ambient temperature and transferred onto a filter strip where it is washed in counter-current with cyclohexane used in a quantity of 200% by weight with respect to the polymer. The polymer discharged has a content of orthoester less than that analytically detectable ($\leq$500 ppm).

The polymer is then suspended for two hours in cyclohexane (weight ratio of 1:4), containing 3% by weight of triethylamine, at boiling point. After centrifuging and further washing with the solvent, the polymer is dried under vacuum at 80° C.

Thus 14.25 Kg of etherified polyoxymethylene are recovered on which the determinations given in Table 1 under P-4 are carried out.

TABLE I

| | P - 1 | P - 2 | P - 3 | P - 4 |
|---|---|---|---|---|
| $\eta_e$ (dl/g) | 1.38 | 1.80 | 1.17 | 1.52 |
| $\gamma_a$(g/ml) | 0.68 | 0.29 | 0.59 | 0.20 |
| grain size (%) | | | | |
| >177 microns | 57.3 | 14.0 | — | — |
| 177–60 microns | 37.2 | 36.5 | — | — |
| <60 microns | 5.5 | 49.5 | — | — |
| yield (%) | 99.2 | 99.6 | 99.2 | 95.0 |
| $K_{220}$ (% per minute) | 0.04 | 0.03 | 0.04 | 0.06 |
| ASF (%) | 97.0 | 97.4 | 96.4 | 90.2 |
| $\eta_e$ (ASF) (dl/g) | 1.38 | 1.79 | 1.18 | 1.50 |
| $K_{220}$ (ASF) (% per minute) | 0.02 | 0.02 | 0.02 | 0.02 |

EXAMPLE 5

There is used the reactor of Example 1 provided at its upper end with means for connecting it to a column for scrubbing with water the purge gases. After flushing the reactor with nitrogen, there are introduced into the reactor 50 Kg of crude polyformaldehyde (polyoxymethylene glycol) obtained by the method described in Example 1. The polymer has an inherent viscosity of 1.71 dl/g and the following physical characteristics:

| apparent density | $\gamma_a = 0.71$ g/ml | |
|---|---|---|
| grain size: | >177 micron | 65.3% by weight |
| | 177–60 micron | 31.5% by weight |
| | <60 micron | 3.2% by weight |

After the agitator has been started, there are sprayed into the reactor 3.5 Kg of pure acetic anhydride ($\leq 0.05\%$ by weight of acetic acid) containing 0.25% by weight of dimethyldioctadecylammonium acetate. After ten minutes of agitation, the temperature is brought to 143° C. at a pressure of 1.0 atmosphere gauge and the mass is left under these conditions for 45 minutes and then cooled at 70° C. for twenty-five minutes at an absolute pressure of 0.02 atmospheres.

The polymer recovered, which contains less than 0.2% by weight of residual acetic anhydride, is discharged into cold water (200 liters). After fifteen minutes of stay at a temperature of 30°–40° C., the suspension is centrifuged and the polymer is washed thoroughly with water and dried under vacuum at 80° C. In this manner, 46.2 Kg of acetylated polyformaldehyde are recovered on which determinations of the inherent viscosity ($\eta_e$), apparent density ($\gamma_a$) and grain size are carried out, the values being given in Table 2 under P-5. To the powdery polymer thus obtained are added 0.3% by weight of pentaerythritol-tetra-$\beta$(4-hydroxy-3,5-di-t-butylphenyl) propionate and 0.5% by weight of the product of the copolymerization of caprolactone with caprolactam in a molar ratio of 5:95.

The mixture thus obtained is fused in a laboratory screw-extruder (Brabender-type) at a temperature of 190° to 220° C. and is converted into 2×2 mm granules by means of a cutter.

The following determinations are carried out on the granules:

$K_{220}$: thermal degradation at 220° C. in a nitrogen atmosphere; the measurement is carried out by means of a thermo-balance which indicates the rate of decomposition as a percentage by weight of the polymer per minute during the first thirty minutes;

$D_{220}$: thermal degradation at 220° C. in air; the measurement is carried out by means of a thermo-balance which indicates the loss in percentage weight of the polymer after ten and twenty minutes.

The results of these tests are given in Table 2, still under P-5.

TABLE 2

| | P-5 | P-6 | P-7 | P-8 |
|---|---|---|---|---|
| $\eta_e$ (dl/g) | 1.70 | 1.19 | 1.42 | 1.68 |
| $\gamma_a$ (ml/g) | 0.73 | 0.22 | 0.39 | 0.62 |
| Grain size (% by weight) | | | | |
| >177 microns | 62.3 | 8.9 | — | — |
| 177–60 microns | 33.4 | 48.6 | — | — |
| <60 microns | 4.3 | 42.5 | — | — |
| Yield (%) | 92.4 | 93.0 | 93.0 | 92 |
| $K_{220}$ | 0.05 | 0.03 | 0.03 | 0.04 |
| $D_{220}$ | | | | |
| 10 minutes | 0.8 | 0.6 | 0.6 | 0.7 |
| 20 minutes | 1.7 | 1.4 | 1.5 | 1.6 |

EXAMPLE 6

A crude polyformaldehyde was esterified under conditions similar to those of Example 5. In particular, the polyformaldehyde had the following characteristics:

| $\eta_e = 1.12$ dl/g | | |
|---|---|---|
| $\gamma_a = 0.21$ g/ml | | |
| Grain size | >177 micron | 10.8% by weight |
| | 177–60 micron | 48.3% by weight |
| | <60 micron | 40.9% by weight |

The reaction being carried out under strictly anhydrous conditions, 16 Kg of polymer were admixed with a liquid consisting of 90 wt.% of anhydrous acetone and 10 wt.% of pure acetic anhydride ($\leq 0.05\%$ by weight of acetic acid). After filtration in a centrifuge, the polymer was loaded into the reactor under agitation.

The powder contained 0.38 parts by weight of liquid for every part by weight of polymer. The temperature of the system was brought to 40° C. for 20 minutes, under an absolute pressure of 0.55 atmospheres. The solvent content with respect to the polymer was thus reduced to a value of less than 0.2% by weight. At this point the system was brought to a pressure of 2 atmospheres gauge and heated at 145° C. for 40 minutes. At the end of this period the reaction mixture was discharged quickly into cold water (200 liters). The resulting suspension was maintained under agitation for fifteen minutes at 30°–40° C. and then centrifuged. After washing with water until the latter was neutral, the polymer was dried at 80° C. under vacuum.

Thus 14.88 Kg of acetylated polyformaldehyde were recovered on which the determinations indicated in Example 5 were carried out. The results are given in Table 2 under P-6.

EXAMPLE 7

The esterification reaction was carried out with crude polyformaldehyde in powder form obtained in a similar manner to that indicated in Example 1 and having the following characteristics:

$\eta_e = 1.40$ dl/g $\gamma_a = 0.37$ ml/g

The reaction being carried out under strictly anhydrous conditions, 30 Kg of the polyformaldehyde were dispersed in a liquid containing 84 wt.% of anhydrous benzene and 16 wt.% of propionic anhydride.

After filtration in a centrifuge, the polymer was loaded into the reactor under agitation. The powder contained 0.30 parts by weight of liquid for every part by weight of polymer. The temperature of the system was brought to 40° C. for twenty minutes under an absolute pressure of 0.5 atmospheres. The solvent content was thus reduced to a value of less than 0.3% by weight with respect to the polymer. The pressure was then brought to a value of 2 atmospheres gauge and the mass was heated at 150° C. for twenty-five minutes. At the end of this period, the reaction mixture was cooled to about 50° C. and transferred onto a continuous filter strip where it was washed in counter-current with benzene used in a weight ratio of 2:1 with respect to the polymer. The content of propionic anhydride in the esterified polyoxymethylene thus treated was less than that analytically detectable (<100 ppm) and the polyoxymethylene was dried under vacuum at 80° C. Thus 27.9 Kg of polymer were recovered on which the determinations indicated in Example 5 were carried out. The results of these determinations are given in Table 2 under P-7.

EXAMPLE 8

50 Kg of crude polyformaldehyde in powder form, having an inherent viscosity of 1.67 dl/g were introduced into the reactor of Example 5 under strictly anhydrous conditions. The agitator was started and then a liquid consisting of 4.1 Kg of pure acetic anhydride and 2.5 g of polyvinyl pyrrolidone (molecular weight about 30,000) was introduced. After ten minutes of agitation at ambient temperature, the reactor was brought to a pressure of 0.8 atmospheres gauge and to a temperature of 140° C., and the mass was left under these conditions for thirty minutes.

The mass was then cooled to 90° C. for twenty minutes, the pressure being brought simultaneously to about 0.02 atmospheres absolute. The unreacted reagent was thus collected in the condenser located downstream of the exchanger.

The acetylated polyformaldehyde was then discharged into 200 liters of water, and the resulting suspension was maintained under agitation at 30°-40° C. for twenty minutes and then centrifuged. The polymer, after washing with water until the latter was neutral, was dried under vacuum at 80° C.

In this manner 46.0 Kg of polymer were recovered, the characteristics of which are given in Table 2 under P-8.

We claim:

1. A process for esterifying or etherifying the terminal hydroxyl groups of an acetal polymer by reacting said polymer with an end-capping agent selected from the group consisting of anhydrides of carboxylic acids, orthoesters and orthocarbonates, which comprises forming an intimate mixture of acetal polymer in powder form and end-capping agent in liquid form, the amount of said liquid end-capping agent in the mixture being from 0.01 to 0.30 parts by weight per part by weight of acetal polymer and less than that which results in loss of the free-flowing characteristics of the polymer powder, reacting said mixture under stirring at a temperature of at least 50° C. until completion or substantial completion of the end-capping reaction, and recovering the polymer thus end-capped from the reaction product.

2. The process of claim 1, wherein the end-capping agent is used in an amount of from 0.02 to 0.15 parts by weight for each part by weight of acetal polymer.

3. The process of claim 1, wherein the acetal polymer is in the form of granules with a size of from 20 to 500 microns.

4. The process of claim 1, wherein the acetal polymer has an apparent density of from 0.05 to 0.8 g/ml.

5. The process of claim 1, wherein said intimate mixture is formed by admixing the polymer with the end-capping agent in solution in an inert (non-reactive) diluent, and removing said diluent at a temperature less than the end-capping temperature.

6. The process of claim 1, wherein the end-capping reaction is carried out at a temperature of from 70° to 170° C.

7. The process of claim 1, wherein the end-capping reaction is carried out at a pressure such as to maintain the end-capping agent substantially in liquid form.

8. The process of claim 1, wherein the end-capping reaction is carried out for a period of from 5 to 90 minutes.

9. A process for esterifying or etherifying the terminal hydroxyl groups of an acetal polymer by reacting said polymer with an end-capping agent selected from the group consisting of acetic, propionic and butyric anhydrides, methyl and ethyl orthoformates, methyl and ethyl orthoacetate and methyl and ethyl orthocarbonates, which comprises forming an intimate mixture of acetal polymer in powder form and end-capping agent in liquid form, the amount of said liquid end-capping agent in the mixture being 0.01 to 0.30 parts by weight per part by weight acetal polymer and less than that which results in loss of the free-flowing characteristics of the polymer powder, reacting said mixture under stirring at a temperature of at least 50° C. until completion or substantial completion of the end-capping reaction, and recovering the polymer thus end-capped from the reaction product.

10. The process of claim 1 wherein said terminal hydroxyl groups are esterified.

11. The process of claim 1 wherein said terminal hydroxyl groups are etherified.

12. The process of claim 10 wherein said reaction is carried out in the presence of a catalyst or an agent which inhibits degradation of the acetal polymer.

13. The process of claim 11 wherein said reaction is carried out in the presence of a catalyst.

14. The process of claim 10 wherein said end-capping agent is an anhydride of acetic, propionic, or butyric acid.

15. The process of claim 11 wherein said end-capping agent is methyl or ethyl orthoformate, methyl or ethyl orthoacetate, methyl or ethyl orthobenzoate, or methyl or ethyl orthocarbonate.

* * * * *